US007864930B2

(12) United States Patent
Clark et al.

(10) Patent No.: US 7,864,930 B2
(45) Date of Patent: Jan. 4, 2011

(54) SYSTEMS AND METHODS FOR REGISTRATION AND RETRIEVAL OF VOICE MAIL CONTACT INFORMATION

(75) Inventors: David William Clark, Carp (CA); Sean M. Murray, Toronto (CA); David Edward Johnston, Whitby (CA)

(73) Assignee: BCE Inc., Verdun, Quebec (CA)

( * ) Notice: Subject to any disclaimer, the term of this patent is extended or adjusted under 35 U.S.C. 154(b) by 564 days.

(21) Appl. No.: 11/289,582

(22) Filed: Nov. 30, 2005

(65) Prior Publication Data

US 2006/0159242 A1     Jul. 20, 2006

Related U.S. Application Data

(63) Continuation of application No. PCT/CA2005/001516, filed on Sep. 30, 2005.

(60) Provisional application No. 60/638,391, filed on Dec. 27, 2004, provisional application No. 60/638,386, filed on Dec. 27, 2004.

(51) Int. Cl.
*H04M 11/00* (2006.01)

(52) U.S. Cl. ............... 379/88.18; 370/352; 370/353; 370/354; 370/355; 370/356; 379/74; 379/85; 379/88.11; 379/88.12; 379/88.13; 379/88.17; 379/88.19; 379/142.06; 379/142.15; 379/201.01; 455/412.1; 455/412.2; 455/413; 709/202; 709/203; 709/206; 709/228; 709/229

(58) Field of Classification Search ......... 370/351–356; 379/67.1–88.28, 142.06, 142.15, 201.01; 455/412.1–413; 709/201–203, 206, 227–229
See application file for complete search history.

(56) References Cited

U.S. PATENT DOCUMENTS

| 5,003,577 | A | | 3/1991 | Ertz et al. |
|---|---|---|---|---|
| 5,568,540 | A | | 10/1996 | Greco et al. |
| 5,737,395 | A | | 4/1998 | Irribarren |
| 5,835,570 | A | * | 11/1998 | Wattenbarger ........... 379/88.03 |

(Continued)

FOREIGN PATENT DOCUMENTS

EP     1 014 653 A2     6/2000

(Continued)

OTHER PUBLICATIONS

Office Action mailed on Apr. 15, 2008 in connection with U.S. Appl. No. 11/289,581.

(Continued)

*Primary Examiner*—Hemant Patel (57) ABSTRACT

Methods, apparatus and computer-readable media for registering and retrieving contact information associated with a potential calling party. The registration method comprises receiving an originating address associated with the potential calling party, receiving contact information associated with the potential calling party and storing the originating address associated with the potential calling party in an originating address field of a record associated with the potential calling party and storing the contact information associated with the potential calling party in a contact information field of the record associated with the potential calling party. This increases the variety of contact information that can be left by the potential calling party, contributes to a greater efficiency with which the eventual called party may retrieve contact information associated with a voice mail message and also accelerates the process by which an actual calling party can leave contact information for the called party.

33 Claims, 7 Drawing Sheets

U.S. PATENT DOCUMENTS

| | | | |
|---|---|---|---|
| 5,838,768 A | 11/1998 | Sumar et al. | |
| 5,898,770 A | 4/1999 | Valentine | |
| 5,956,390 A * | 9/1999 | McKibben et al. | 379/93.07 |
| 6,085,231 A | 7/2000 | Agraharam et al. | |
| 6,163,596 A * | 12/2000 | Gelfer et al. | 379/67.1 |
| 6,198,916 B1 | 3/2001 | Martin et al. | |
| 6,219,413 B1 | 4/2001 | Burg | |
| 6,249,815 B1 | 6/2001 | Foladare et al. | |
| 6,266,400 B1 * | 7/2001 | Castagna | 379/88.25 |
| 6,292,799 B1 * | 9/2001 | Peek et al. | 707/10 |
| 6,351,522 B1 * | 2/2002 | Vitikainen | 379/67.1 |
| 6,385,306 B1 | 5/2002 | Baxter | |
| 6,404,884 B1 * | 6/2002 | Marwell et al. | 379/265.13 |
| 6,456,700 B1 * | 9/2002 | Malik | 379/88.19 |
| 6,459,774 B1 | 10/2002 | Ball et al. | |
| 6,487,278 B1 | 11/2002 | Skladman et al. | |
| 6,535,585 B1 * | 3/2003 | Hanson et al. | 379/88.12 |
| 6,553,222 B1 * | 4/2003 | Weiss | 455/415 |
| 6,560,318 B1 * | 5/2003 | Spielman et al. | 379/88.12 |
| 6,587,871 B1 * | 7/2003 | Schrader | 709/206 |
| 6,590,965 B1 | 7/2003 | Poole et al. | |
| 6,603,846 B1 * | 8/2003 | Cannon et al. | 379/142.06 |
| 6,625,258 B1 | 9/2003 | Ram et al. | |
| 6,633,630 B1 | 10/2003 | Owens et al. | |
| 6,665,378 B1 | 12/2003 | Spielman et al. | |
| 6,671,355 B1 | 12/2003 | Spielman et al. | |
| 6,683,940 B2 | 1/2004 | Contractor | |
| 6,687,340 B1 | 2/2004 | Goldberg et al. | |
| 6,687,362 B1 * | 2/2004 | Lindquist et al. | 379/218.01 |
| 6,738,465 B1 | 5/2004 | Hu | |
| 6,741,679 B1 | 5/2004 | Malik | |
| 6,754,202 B1 | 6/2004 | Sun et al. | |
| 6,757,732 B1 | 6/2004 | Sollee et al. | |
| 6,775,360 B2 | 8/2004 | Davidson et al. | |
| 6,778,644 B1 | 8/2004 | Jenkins et al. | |
| 6,792,082 B1 * | 9/2004 | Levine | 379/67.1 |
| 6,795,541 B2 | 9/2004 | Oren | |
| 6,813,489 B1 | 11/2004 | Wu et al. | |
| 6,823,047 B1 * | 11/2004 | Cruickshank | 379/88.18 |
| 6,826,270 B1 | 11/2004 | Welch et al. | |
| 6,853,714 B2 * | 2/2005 | Liljestrand et al. | 379/201.03 |
| 6,868,140 B2 * | 3/2005 | Myers et al. | 379/67.1 |
| 6,987,840 B1 * | 1/2006 | Bosik et al. | 379/88.17 |
| 7,003,327 B1 * | 2/2006 | Payne et al. | 455/566 |
| 7,133,899 B2 | 11/2006 | Rowe | |
| 7,145,998 B1 * | 12/2006 | Holder et al. | 379/210.01 |
| 7,149,777 B1 | 12/2006 | Rhee | |
| 7,212,614 B1 | 5/2007 | Burg et al. | |
| 7,272,390 B1 | 9/2007 | Adachi et al. | |
| 7,283,808 B2 * | 10/2007 | Castell et al. | 455/413 |
| 7,317,908 B1 | 1/2008 | Eason | |
| 7,444,375 B2 | 10/2008 | McConnell et al. | |
| 2001/0026545 A1 | 10/2001 | Matsumoto et al. | |
| 2002/0055351 A1 * | 5/2002 | Elsey et al. | 455/414 |
| 2002/0076004 A1 | 6/2002 | Brockenbrough et al. | |
| 2002/0110226 A1 | 8/2002 | Kovales et al. | |
| 2002/0122541 A1 | 9/2002 | Metcalf | |
| 2002/0186828 A1 | 12/2002 | Bushnell | |
| 2003/0043974 A1 | 3/2003 | Emerson | |
| 2003/0050046 A1 | 3/2003 | Conneely et al. | |
| 2003/0108166 A1 | 6/2003 | Coppinger et al. | |
| 2003/0202641 A1 | 10/2003 | Huang | |
| 2003/0216137 A1 | 11/2003 | Hymel | |
| 2004/0057425 A1 | 3/2004 | Brouwer et al. | |
| 2004/0076272 A1 | 4/2004 | Zafar et al. | |
| 2004/0141594 A1 * | 7/2004 | Brunson et al. | 379/88.12 |
| 2004/0151287 A1 | 8/2004 | Bedner | |
| 2004/0166832 A1 * | 8/2004 | Portman et al. | 455/412.1 |
| 2004/0208297 A1 * | 10/2004 | Valentine | 379/88.19 |
| 2004/0252679 A1 | 12/2004 | Williams et al. | |
| 2005/0047579 A1 | 3/2005 | Salame | |
| 2005/0101303 A1 * | 5/2005 | Pelaez et al. | 455/413 |
| 2005/0207431 A1 | 9/2005 | Monai | |
| 2006/0062371 A1 | 3/2006 | Vanderheiden et al. | |
| 2006/0177022 A1 | 8/2006 | Lai et al. | |
| 2007/0032267 A1 | 2/2007 | Haitani et al. | |
| 2007/0115919 A1 | 5/2007 | Chahal et al. | |

FOREIGN PATENT DOCUMENTS

| | | |
|---|---|---|
| EP | 1 280 326 A1 | 1/2003 |
| WO | WO 03/055191 A1 | 7/2003 |
| WO | WO 03/092248 A2 | 11/2003 |

OTHER PUBLICATIONS

Office Action mailed on May 9, 2008 in connection with U.S. Appl. No. 11/289,580.
Office Action mailed on May 13, 2008 in connection with U.S. Appl. No. 11/289,692.
Office Action mailed on Oct. 23, 2008 in connection with U.S. Appl. No. 11/289,692.
Office Action mailed on Oct. 28, 2008 in connection with U.S. Appl. No. 11/289,580.
Office Action mailed on Nov. 17, 2008 in connection with U.S. Appl. No. 11/289,581.
Office Action mailed on Mar. 6, 2009 in connection with U.S. Appl. No. 11/289,580.
Office Action mailed on Jun. 22, 2009 in connection with U.S. Appl. No. 11/289,692.
Office Action mailed on Aug. 21, 2009 in connection with U.S. Appl. No. 11/289,580.
PCT/CA2005/001514 (ISR), Jan. 9, 2006, BCE Inc.
PCT/CA2005/001515 (ISR), Jan. 9, 2006, BCE Inc.
PCT/CA2005/001516 (ISR), Jan. 9, 2006, BCE Inc.
PCT/CA2005/001517 (ISR), Jan. 9, 2006, BCE Inc.
Lucent Technologies, Video Mail for Services Providers, 2005, 2 pages, http://www.lucent.com/products/solution/0,,CTID+2014-STID+10535-SOID+1639-LOCL+1,00.html.

* cited by examiner

SYSTEMS AND METHODS FOR REGISTRATION AND RETRIEVAL OF VOICE MAIL CONTACT INFORMATION

CROSS-REFERENCE TO RELATED APPLICATIONS

This application is a CONTINUATION of PCT Patent Application Serial No. PCT/CA2005/001516, filed on Sep. 30, 2005, designating the United States and hereby incorporated by reference herein.

This application CLAIMS THE BENEFIT under 35 U.S.C. 119(e) of U.S. Provisional Patent Application Ser. No. 60/638,391 to Dave Clark et al., filed Dec. 27, 2004 and hereby incorporated by reference herein.

The subject matter of the present application is related to the subject matter of U.S. Provisional Patent Application Ser. No. 60/638,386 to Dave Clark et al., filed Dec. 27, 2004 and hereby incorporated by reference herein.

The subject matter of the present application is also related to the subject matter of PCT Patent Application Serial No. PCT/CA2005/001514, entitled "SYSTEMS AND METHODS FOR RENDERING VOICE MAIL CONTACT INFORMATION AVAILABLE TO A CALLED PARTY", filed on Sep. 30, 2005, designating the United States and hereby incorporated by reference herein.

FIELD OF THE INVENTION

The present invention relates generally to voice mail systems and, more particularly, to systems and methods for registration and retrieval of contact information associated with callers who leave messages in a voice mail system.

BACKGROUND

Voice mail systems provide a convenient way for a caller to leave a message for an intended recipient who is unavailable to answer an incoming call. Specifically, a conventional voice mail system detects when the intended recipient is busy or unresponsive to the call, and consequently answers the call by playing the intended recipient's audio greeting. Following this, the caller is prompted to record a voice mail message, which is stored as an audio recording in a voice mailbox associated with the intended recipient.

When the owner of the mailbox (i.e., the intended recipient) wishes to retrieve the contents of the mailbox at a later time, he or she dials into the voice mail system. The voice mail system authenticates the owner of the mailbox, and subsequently allows the owner of the mailbox to navigate through his or her mailbox in order to perform various functions, such as playback, deletion and forwarding of individual voice mail messages.

In a conventional voice mail system, any contact information that the caller may wish to leave for the owner of the mailbox forms part of the recorded voice mail message. This has several disadvantages.

Firstly, the contact information may be non-existent or, if it is present, it may be buried at an arbitrary point within the voice mail message. This makes it difficult for the owner of the mailbox to retrieve the contact information in an efficient manner.

Secondly, conventional approaches limit the type of contact information that can be left for the intended recipient to audio information in the form of recorded utterances or tones.

Thirdly, the caller who leaves multiple voice mail messages in multiple mailboxes must remember to replicate the contact information each time he or she leaves a voice mail message, making the process of leaving contact information tedious and slow.

Thus, the industry would welcome an improvement that overcomes one or more of the aforementioned deficiencies.

SUMMARY OF THE INVENTION

According to a first broad aspect, the present invention seeks to provide a method of registering contact information associated with a potential calling party. The method comprises receiving an originating address associated with the potential calling party; receiving contact information associated with the potential calling party; and storing the originating address associated with the potential calling party in an originating address field of a record associated with the potential calling party and storing the contact information associated with the potential calling party in a contact information field of the record associated with the potential calling party.

According to a second broad aspect, the present invention seeks to provide a registration entity for registering contact information associated with a potential calling party. The registration entity comprises a database of records including a record associated with the potential calling party; an input for receiving an originating address associated with the potential calling party and contact information associated with the potential calling party; and a processing entity for storing the originating address associated with the potential calling party in an originating address field of the record associated with the potential calling party and storing the contact information associated with the potential calling party in a contact information field of the record associated with the potential calling party.

According to a third broad aspect, the present invention seeks to provide computer-readable media tangibly embodying a program of instructions executable by a computer to perform a method of registering contact information associated with a potential calling party. The method comprises receiving an originating address associated with the potential calling party; receiving contact information associated with the potential calling party; and storing the originating address associated with the potential calling party in an originating address field of a record associated with the potential calling party and storing the contact information associated with the potential calling party in a contact information field of the record associated with the potential calling party.

According to a fourth broad aspect, the present invention seeks to provide a method of retrieving stored contact information associated with a calling party. The method comprises receiving an originating address associated with the calling party, followed by accessing a database of records associated with respective potential calling parties. Each of the records in the database comprises a respective originating address field and a respective contact information field, the originating address field of the record associated with a given potential calling party containing an originating address associated with the given potential calling party and the contact information field of the record associated with the given potential calling party containing contact information associated with the given potential calling party. According to this aspect, accessing the database of records comprises attempting to identify a particular record in the database for which the originating address contained in the respective originating address field corresponds to the originating address associated with the calling party. Responsive to successful identification of a particular record in the database for which the originating address contained in the respective originating address field matches the originating address associated with the calling party, the method further comprises retrieving the contact information contained in the contact information field of the particular record, wherein the contact information contained in the contact information field of the particular record corresponds to previously stored contact information associated with the calling party.

According to a fifth broad aspect, the present invention seeks to provide a network entity, which comprises a database of records, each of the records being associated with a respective potential calling party and including (I) an originating address field containing an originating address associated with the respective potential calling party and (II) a contact information field containing previously stored contact information associated with the respective potential calling party. The network entity further comprises an input for receiving an originating address associated with a calling party and a processing entity in communication with the input. The processing entity is operative for accessing the database of records in an attempt to identify a particular record in the database for which the originating address contained in the respective originating address field corresponds to the originating address associated with the calling party. Responsive to successful identification of a particular record in the database for which the originating address contained in the respective originating address field matches the originating address associated with the calling party, the processing entity is further operative for retrieving the contact information contained in the contact information field of the particular record. The network entity also comprises an output for releasing the retrieved contact information.

According to a sixth broad aspect, the present invention seeks to provide a system, which comprises a contact information server that comprises a database of records, each of the records being associated with a respective potential calling party and including (I) an originating field containing an originating address associated with the respective potential calling party; and (II) a contact information field containing previously stored contact information associated with the respective potential calling party. The system also comprises a voice message taking entity that comprises a plurality of mailboxes associated with respective mailbox owners, the voice message taking entity being operable for executing a reconnaissance process to (I) determine an originating address associated with a particular calling party attempting to reach an owner of a particular mailbox; and (II) supply the originating address associated with the particular calling party to the contact information server. Responsive to receipt of the originating address associated with the particular calling party from the voice message taking entity, the contact information server is adapted for accessing the database of records in an attempt to identify a particular record in the database for which the originating address contained in the respective originating address field corresponds to the originating address associated with the particular calling party. Responsive to successful identification of a particular record in the database for which the originating address contained in the respective originating address field matches the originating address associated with the particular calling party, the contact information server is adapted for retrieving the contact information contained in the contact information field of the particular record. Finally, the contact information server is adapted for returning the retrieved contact information to the voice message taking entity for delivery to the owner of the particular mailbox.

According to a seventh broad aspect, the present invention seeks to provide a method of retrieving stored contact information associated with a calling party making a call. The method comprises receiving an originating address associated with the calling party and accessing a database of records associated with respective potential calling parties. Each of the records in the database comprises a respective originating address field and a plurality of respective contact information fields, the originating address field of the record associated with a given potential calling party containing an originating address associated with the given potential calling party and each of the contact information fields of the record associated with the given potential calling party containing respective contact information associated with the given potential calling party. The method further comprises receiving a contact information selection associated with the call. According to this aspect, accessing the database of records comprises attempting to identify a particular record in the database for which the originating address contained in the respective originating address field corresponds to the originating address associated with the calling party. Responsive to successful identification of a particular record in the database for which the originating address contained in the respective originating address field matches the originating address associated with the calling party, the method further comprises retrieving the contact information contained in a selected one of the contact information fields of the particular record, the selected one of the contact information fields being related to the contact information selection associated with the call, wherein the contact information contained in the selected one of the contact information fields of the particular record corresponds to previously stored contact information associated with the calling party.

According to an eighth broad aspect, the present invention seeks to provide a network entity, which comprises a database of records, each of the records being associated with a respective potential calling party and including (I) an originating address field containing an originating address associated with the respective potential calling party and (II) a plurality of contact information fields each containing previously stored contact information associated with the respective potential calling party. The network entity further comprises an input for receiving (I) an originating address associated with a calling party and (II) a contact information selection associated with the call. The network entity further comprises a processing entity in communication with the input and operative for accessing the database of records in an attempt to identify a particular record in the database for which the originating address contained in the respective originating address field corresponds to the originating address associated with the calling party. Responsive to successful identification of a particular record in the database for which the originating address contained in the respective originating address field corresponds to the originating address associated with the calling party, the processing entity is operative for retrieving the contact information contained in a selected one of the contact information fields of the particular record, the selected one of the contact information fields being related to the contact information selection associated with the call. Finally, the network entity comprises an output for releasing the retrieved contact information.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

FIGS. 1A through 1E show a voice mail system in accordance with various non-limiting embodiments of the present invention. In each case, the voice mail system comprises a voice message taking entity (VMTE) 12 in communication with a contact information server (CIS) 14. The VMTE 12 comprises or is in communication with a mailbox database 30 that includes a mailbox 16. Each of the mailboxes in the mailbox database 30, including mailbox 16, has the capability of storing one or more voice mail messages and is associated with a called party that is hereinafter referred to as the "owner" of the respective mailbox.

Figure 1A:
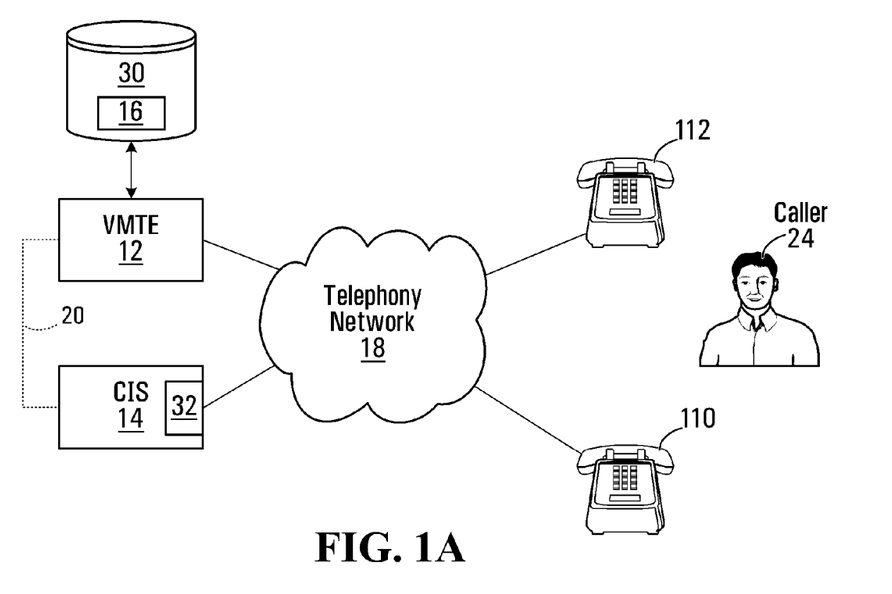
FIGS. 1A to 1E are conceptual block diagrams depicting interaction between a caller and a voice mail system that comprises a voice message taking entity (VMTE) and a contact information server (CIS)
Figure 1B:
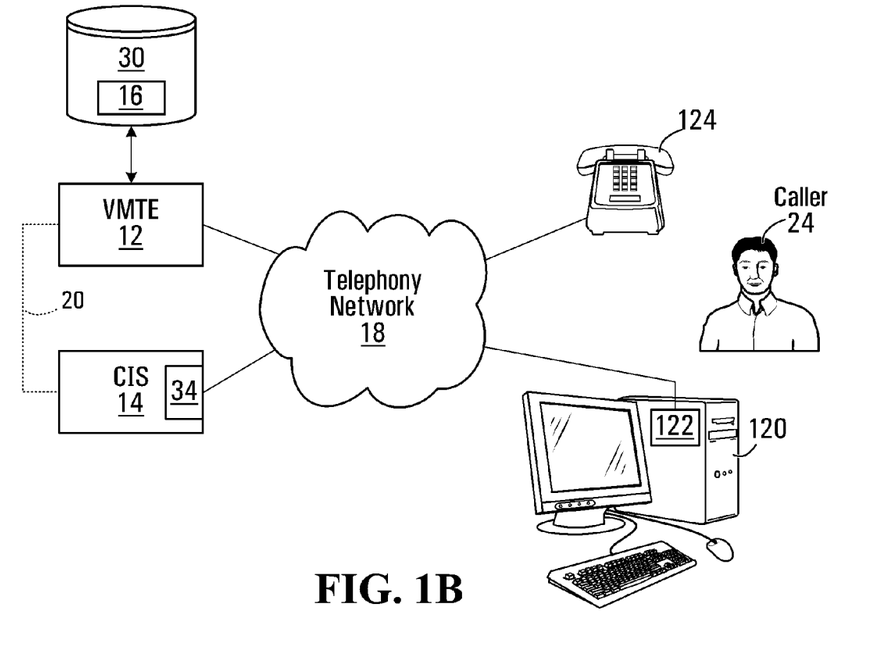
Figure 1C:
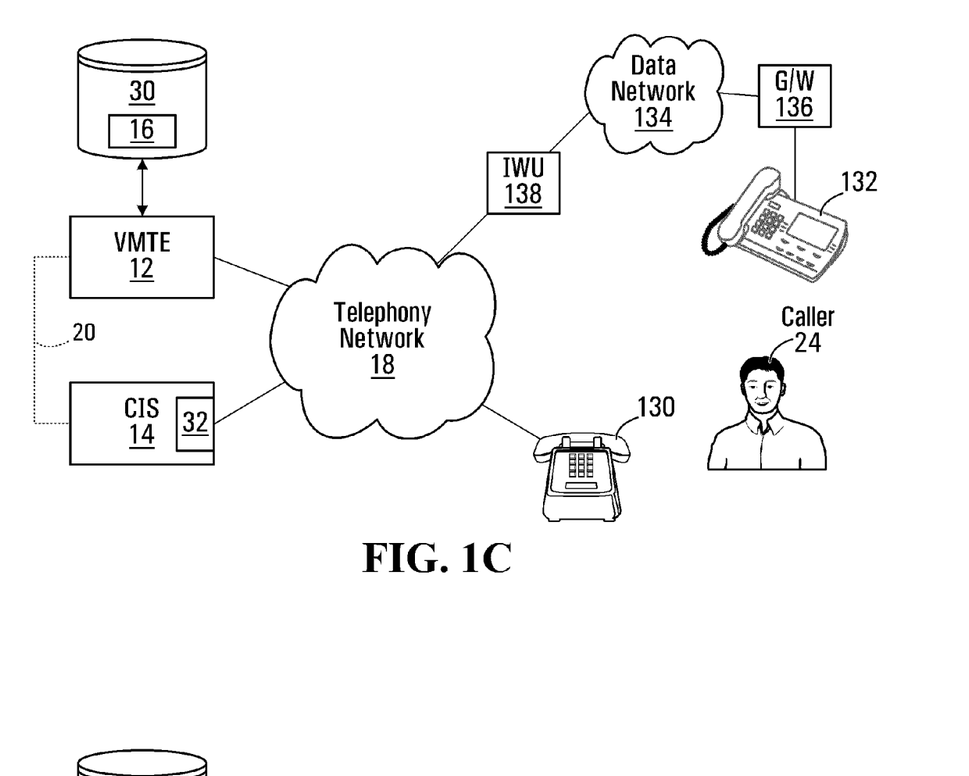

In the embodiments of FIGS. 1A, 1B and 1C, the VMTE 12 and the CIS 14 are both reachable over a telephony network 18. The telephony network 18 may include the public switched telephone network (PSTN), and/or it may include one or more wireless networks. In addition, the VMTE 12 and the CIS 14 may optionally be connected to each other by a direct link 20 that bypasses the telephony network 18. Furthermore, a private branch exchange (not shown) may act as a gateway between the telephony network 18 and either or both of the VMTE 12 and the CIS 14.

Figure 1D:
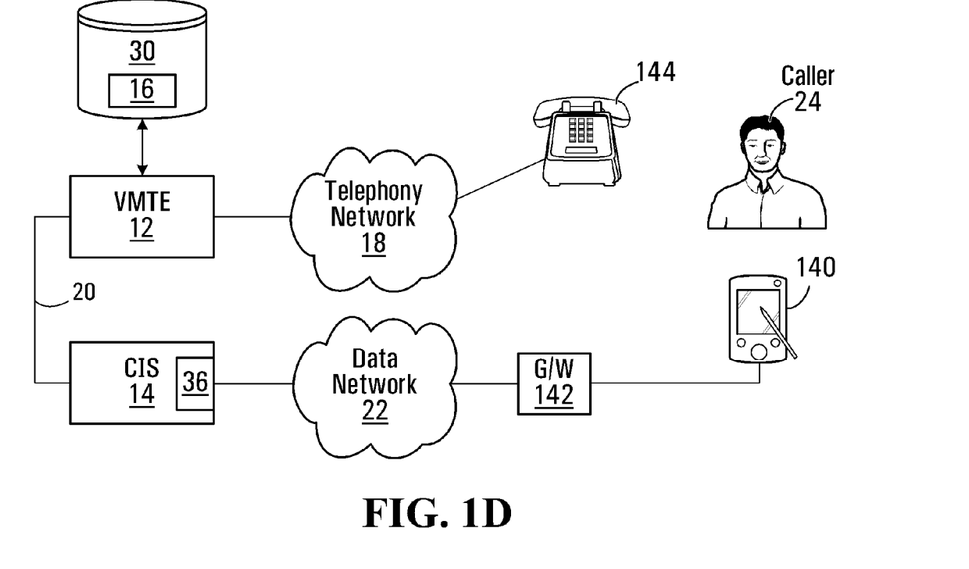

In the embodiment of FIG. 1D, the VMTE 12 is reachable over the telephony network 18, while the CIS 14 is reachable over a data network 22. The VMTE 12 is connected to the CIS 14 over a communications link 20. Alternatively, an interworking unit (not shown) disposed between the telephony network and the data network 22 may provide communication between the VMTE 12 and the CIS 14. The data network 22 may include the Internet and/or one or more wireless networks. Accordingly, the CIS 14 may be implemented as a Web server.

Figure 1E:
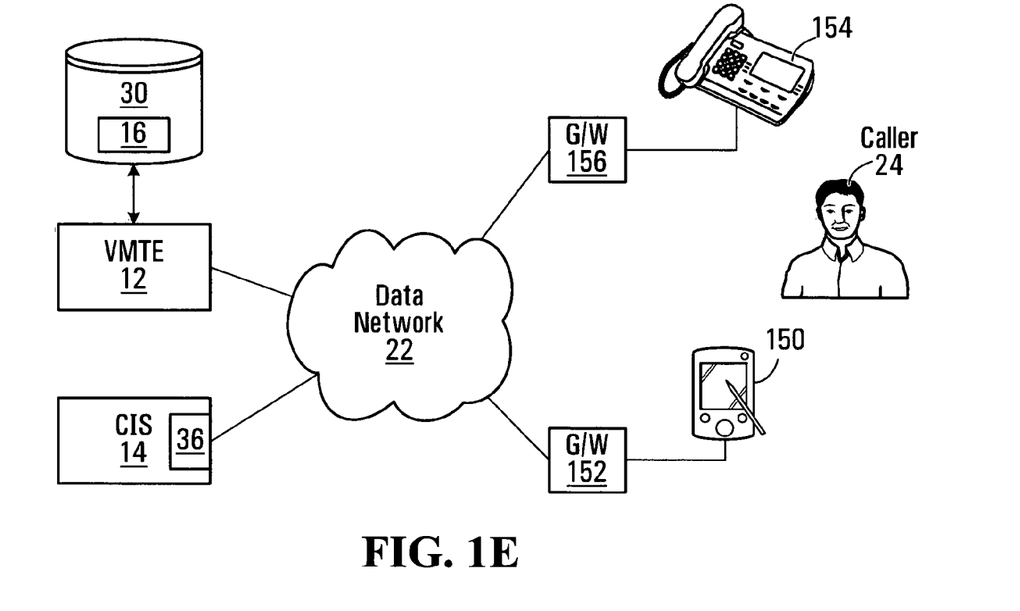

In the embodiment of FIG. 1E, the VMTE 12 and the CIS 14 are both reachable over the data network 22. Each of the VMTE 12 and the CIS 14 may have direct access to the data network 22 or may be connected thereto via an access gateway (not shown).

Generally speaking, the present invention contemplates a scenario whereby a calling party (hereinafter a caller 24) attempts to reach the owner of mailbox 16, but fails and is prompted by the VMTE 12 to leave a voice mail message in mailbox 16. This can be termed the "calling phase". The calling phase is preceded by a "registration phase", during which the caller 24 will register "contact information" (to be described later on in greater detail) with the CIS 14. The registration phase and the calling phase are now described in the context of the various embodiments depicted in FIGS. 1A through 1E.

I—Registration of Caller's Contact Information with the CIS 14

FIG. 1A

In the embodiment of FIG. 1A, the caller 24 uses a telephone 110 connected to the telephony network 18 when accessing the CIS 14 during the registration phase. Then, during the calling phase, the caller 24 uses another telephone 112 connected to the telephony network 18 when placing a call to the owner of mailbox 16. It is within the scope of the present invention for the telephone 110 and the telephone 112 to be one and the same device, as it is also possible for the two telephones 110, 112 to be different devices and possibly located in different geographic areas.

Upon being contacted by the caller 24 using the telephone 110, the CIS 14 and the caller 24 undergo a registration phase. The registration phase involves the CIS 14 receiving an originating address associated with the caller 24 and contact information associated with the caller 24.

Specifically, the originating address associated with the caller 24 can take on at least two different forms. In a first form, the originating address refers to the directory number of the telephone 112 from which the caller 24 expects to make future calls. In a second form, the originating address refers to a code that the caller 24 intends to use to identify himself or herself when interacting with the VMTE 12 during the later calling phase. The registration phase can involve the CIS 14 implementing an interactive voice response system 32 in order to prompt the caller 24 to enter the originating address using the telephone 110.

The contact information refers to information that the caller 24 wishes to render available to the owner of mailbox 16 when such owner retrieves the caller's 24 voice mail message from mailbox 16 at a later time. Examples of contact information include but are not limited to a name, telephone number, alternate telephone number, fax number, email address, web page address (URL), salutation, slogan, confidentiality notice (e.g., of the type "THE INFORMATION CONTAINED IN THIS MESSAGE IS CONFIDENTIAL AND ONLY FOR THE INTENDED RECIPIENT . . ."), etc. In addition, the contact information may, as a matter of redundancy, also include the originating address associated with the caller 24. The CIS 14 may implement the aforementioned interactive voice response system 32 in order to prompt the caller 24 to enter the contact information using the telephone 110. The CIS 14 may also implement a speech-to-text conversion utility (not shown) to facilitate the entry of contact information by the caller 24.

FIG. 1B

In the embodiment of FIG. 1B, the caller 24 accesses the CIS 14 during the registration phase using a computer 120 that is equipped with a modem 122 connected to the telephony network 18. Then, during the calling phase, the caller 24 uses a telephone 124 when placing a call to the owner of mailbox 16.

Upon being contacted by the caller 24 using the computer 120, the CIS 14 and the caller 24 undergo a registration phase, which involves the CIS 14 receiving an originating address associated with the caller 24 and contact information associated with the caller 24.

Specifically, the originating address can take on at least two different forms. In a first form, the originating address refers to the directory number of the telephone 124 from which the caller 24 expects to make future calls. In a second form, the originating address refers to a code that the caller 24 intends to use to identify himself or herself when interacting with the VMTE 12 during the later calling phase. The CIS 14 may execute an interactive query-response program 34 in order to prompt the caller 24 to enter the originating address using the computer 120.

The contact information refers to information that the caller 24 wishes to render available to the owner of mailbox 16 when such owner retrieves the caller's 24 voice mail message from mailbox 16 at a later time. In addition to the above examples of contact information, additional examples of contact information that can be entered with the aid of the computer 120 include but are not limited to a company logo, an image and a file attachment (e.g., text, video, audio, multimedia). The CIS 14 may execute the aforementioned interactive query-response program 34 in order to prompt the caller 24 to enter the contact information using the computer 120.

FIG. 1C

In the embodiment of FIG. 1C, the caller 24 uses a telephone 130 when accessing the CIS 14 during the registration phase. Then, during the calling phase, the caller 24 places a call to the owner of mailbox 16 using an IP-enabled telephony device 132. The IP-enabled telephony device 132 is connected to a data network 134 (such as the Internet) via an access gateway or server 136. The data network 134 is connected to the telephony network 18 via an interworking unit (IWU) 138. Non-limiting examples of the IP-enabled telephony device 132 include an IP phone and a desktop or laptop computer equipped with telephony software.

Upon being contacted by the caller 24 using the telephone 130, the CIS 14 and the caller 24 undergo a registration phase, which involves the CIS 14 receiving an originating address associated with the caller 24 and contact information associated with the caller 24.

Specifically, the originating address can take on at least two different forms. In a first form, the originating address refers to the directory number of the IP-enabled telephony device 132 from which the caller 24 expects to make future calls. In a second form, the originating address refers to a code that the caller 24 intends to use to identify himself or herself when interacting with the VMTE 12 during the later calling phase. The CIS 14 may implement an interactive voice response system 32 in order to prompt the caller 24 to enter the originating address using the telephone 130.

The contact information refers to information that the caller 24 wishes to render available to the owner of mailbox 16 when such owner retrieves the caller's 24 voice mail message from mailbox 16 at a later time. Examples of contact information include but are not limited to a name, telephone number, alternate telephone number, fax number, email address, web page address (URL), salutation, slogan, confidentiality notice, etc. In addition, the contact information may, as a matter of redundancy, also include the originating address associated with the caller 24. The CIS 14 may implement the aforementioned interactive voice response system 32 in order to prompt the caller 24 to enter the contact information using the telephone 130. The CIS 14 may also implement a speech-to-text conversion utility (not shown) to facilitate the entry of contact information by the caller 24.

FIG. 1D

In the embodiment of FIG. 1D, it is recalled that the CIS 14 is connected to the data network 22 such as the Internet. The caller 24 accesses the CIS 14 during the registration phase using an IP-enabled communication device 140 that is also connected to the data network 22, possibly via a gateway or server 142. Non-limiting examples of the IP-enabled communication device 140 include a desktop computer, laptop computer, personal digital assistant (PDA), smart phone, etc. During the calling phase, in this embodiment, the caller 24 uses a telephone 144 connected to the telephony network 18 when placing a call to the owner of mailbox 16.

Upon being contacted by the caller 24 using the IP-enabled communication device 140, the CIS 14 and the caller 24 undergo a registration phase, which involves the CIS 14 receiving an originating address associated with the caller 24 and contact information associated with the caller 24.

Specifically, the originating address can take on at least two different forms. In a first form, the originating address refers to the directory number of the telephone 144 from which the caller 24 expects to make future calls. In a second form, the originating address refers to a code that the caller 24 intends to use to identify himself or herself when interacting with the VMTE 12 during the later calling phase. The CIS 14 may execute a graphical user interface (GUI) program 36 to present to the caller 24 an interface that facilitates entry of the originating address using the IP-enabled communication device 140.

The contact information refers to information that the caller 24 wishes to render available to the owner of mailbox 16 when such owner retrieves the caller's 24 voice mail message from mailbox 16 at a later time. Examples of contact information include but are not limited to a name, telephone number, alternate telephone number, fax number, email address, web page address (URL), salutation, slogan, confidentiality notice, company logo, image and file attachment (e.g., text, video, audio, multimedia), etc. In addition, the contact information may, as a matter of redundancy, also include the originating address associated with the caller 24. The registration phase can involve executing the aforementioned GUI program 36 to present to the caller 24 an interface that facilitates entry of the contact information using the IP-enabled communication device 140.

FIG. 1E

In the embodiment of FIG. 1E, the caller 24 accesses the CIS 14 during the registration phase using an IP-enabled communication device 150 that is connected to the data network 22, possibly via a first gateway or server 152. Examples of the IP-enabled communication device 150 include a desktop computer, laptop computer, personal digital assistant (PDA), smart phone, etc. During the calling phase, the caller 24 uses an IP-enabled telephony device 154 when placing a call to the owner of mailbox 16. The IP-enabled telephony device 154 is also connected to the data network 22, possibly via the first gateway or server 152, or via a second gateway or server 156. Examples of the IP-enabled telephony device 154 include an IP phone and a desktop or laptop computer equipped with telephony software. Clearly, IP-enabled communication devices with telephony capabilities can serve as both the IP-enabled communication device 150 and the IP-enabled telephony device 154.

Upon being contacted by the caller 24 using the IP-enabled communication device 150, the CIS 14 and the caller 24 undergo a registration phase, which involves the CIS 14 receiving an originating address associated with the caller 24 and contact information associated with the caller 24.

Specifically, the originating address can take on at least two different forms. In a first form, the originating address refers to an IP address of the IP-enabled telephony device 154 from which the caller 24 expects to make future calls. In a second form, the originating address refers to a code that the caller 24 intends to use to identify himself or herself when interacting with the VMTE 12 during the later calling phase. The CIS 14 may execute a GUI program 36 to present to the caller 24 an interface that facilitates entry of the originating address using the IP-enabled communication device 150.

The contact information refers to information that the caller 24 wishes to render available to the owner of mailbox 16 when such owner retrieves the caller's 24 voice mail message from mailbox 16 at a later time. Examples of contact information that can be entered in this embodiment include but are not limited to a name, telephone number, alternate telephone number, fax number, email address, web page address (URL), salutation, slogan, confidentiality notice, company logo, image and file attachment (e.g., text, video, audio, multimedia), etc. In addition, the contact information may, as a matter of redundancy, also include the originating address associated with the caller 24. The CIS 14 may execute the aforementioned GUI program 36 to present to the caller 24 an interface that facilitates entry of the contact information using the IP-enabled communication device 150.

Of course, it should be understood that the above examples are not exhaustive of the scenarios in which the present invention is applicable and that further scenarios will be apparent to those of ordinary skill in the art.

Figure 2:
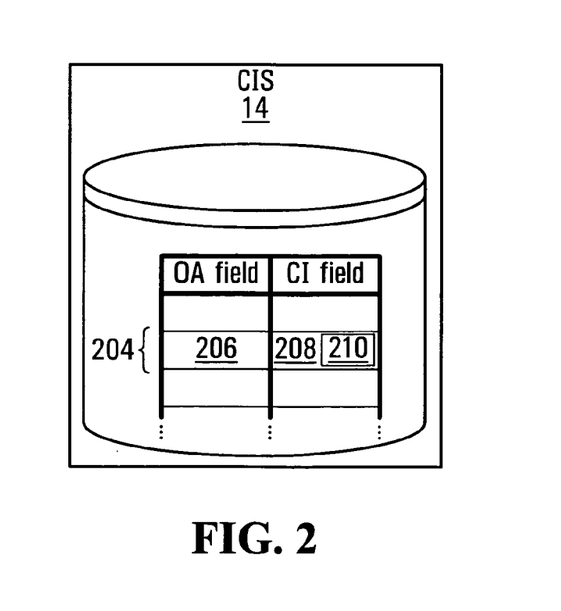
FIG. 2 illustrates a possible structure of a contact information database in the CIS, in accordance with an embodiment of the present invention.

With additional reference now to FIG. 2, the CIS 14 stores the aforementioned originating address associated with the caller 24 and the aforementioned contact information associated with the caller 24 in a database 202 (hereinafter referred to as a "contact information database"). The database 202 may reside internally or externally to the CIS 14. The contact information database 202 comprises a set of records associated with respective callers, each record having an originating address (OA) field as well as a contact information (CI) field. In the case of the caller 24, the associated record is denoted by the reference number 204 in FIG. 2. The originating address associated with the caller 24 is stored as an entry 206 in the OA field of the record 204, while the contact information associated with the caller 24 is stored as an entry 208 in the CI field of the record 204. Where the entry 206 in the OA field of the record 204 is a caller-specified code (as opposed to a phone number or IP address), such code is hereinafter denoted by the reference number 210.

II—Interaction Between the VMTE 12 and the Caller 24

At some instant in time subsequent to the registration phase, the caller 24 may decide to place a call to the owner of mailbox 16. In the embodiments of FIGS. 1A, 1B and 1D, the caller 24 is depicted as using a telephone (either 112, 124 or 144) in an attempt to reach the owner of mailbox 16. Alternatively, in the embodiments of FIGS. 1C and 1E, the caller 24 uses an IP-enabled telephony device (either 132 or 154, as appropriate) in an attempt to reach the owner of mailbox 16.

In the event that the owner of mailbox 16 cannot be reached, the VMTE 12 begins an interaction with the caller 24 and prompts the caller 24 to record a voice mail message for the owner of mailbox 16. Upon termination of the recording, the VMTE 12 stores the voice mail message in mailbox 16 for subsequent retrieval by the owner of mailbox 16. Commonly, the voice mail message may be stored as an audio file, which may be in a format such as ".wav" or ".au", for example.

At some point after interaction between the VMTE 12 and the caller 24 has begun, and either before, during or following the act of recording the voice mail message, the VMTE 12 executes a "reconnaissance process" to determine the originating address associated with the caller 24. Two different embodiments of the reconnaissance process are now described in greater detail.

Figure 3A:
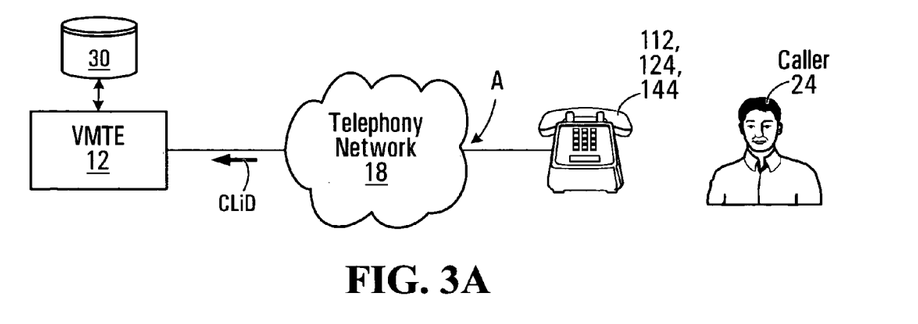
FIGS. 3A to 3C are conceptual block diagrams illustrating the manner in which the VMTE passively obtains an originating address associated with the caller, in accordance with various embodiments of the present invention.
Figure 3B:
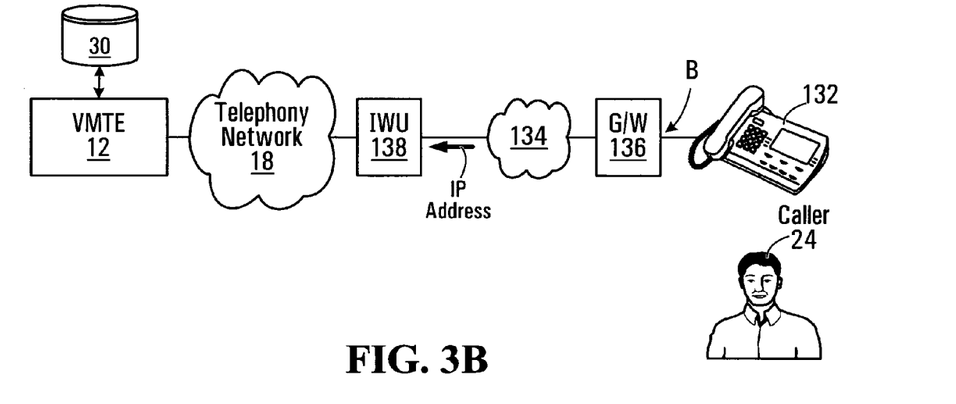
Figure 3C:
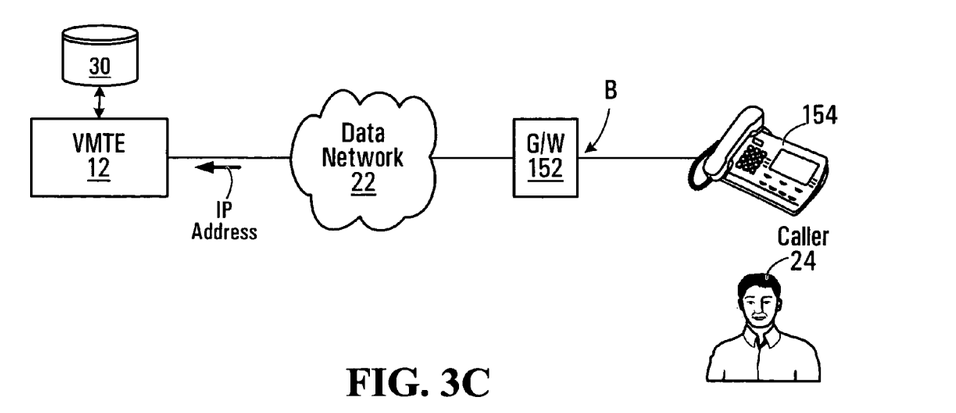

Firstly, in an example embodiment illustrated in FIGS. 3A, 3B and 3C, the reconnaissance process passively determines the originating address associated with the caller 24 without interacting therewith. This embodiment is particularly applicable where the entry 206 in the OA field of the record 204 specifies either (a) the directory number of the telephone (112, 124, 144) from which the caller 24 expected to make future calls or (b) the IP address of the IP-enabled telephony device (134, 154) from which the caller 24 expected to make future calls.

Specifically, as shown in FIG. 3A, when the caller 24 uses a telephone (112, 124, 144), the VMTE 12 may rely on caller line identification (CLID) technology to learn the point A in the telephony network 18 from which the call has originated. On the other hand, as shown in FIGS. 3B and 3C, when the caller 24 is using an IP-enabled telephony device (132, 154), the VMTE 12 may use Internet Protocol (IP) technology (e.g., IP address sniffing) to learn the IP address B of the device having originated the call.

Figure 4A:
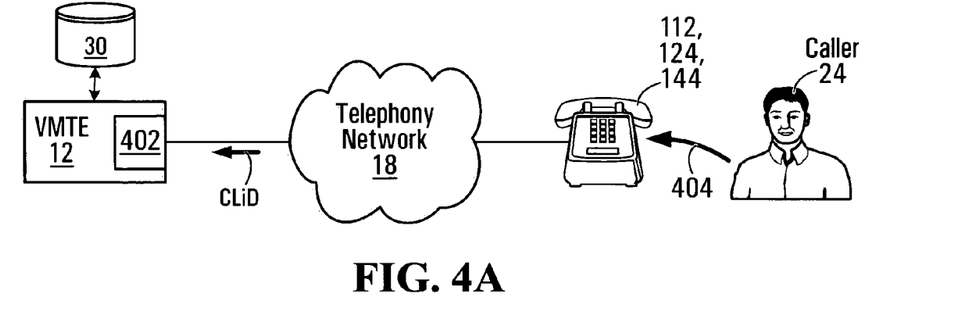
FIGS. 4A to 4C are conceptual block diagrams illustrating the manner in which the VMTE actively obtains an originating address submitted by the caller, in accordance with various embodiments of the present invention.
Figure 4B:
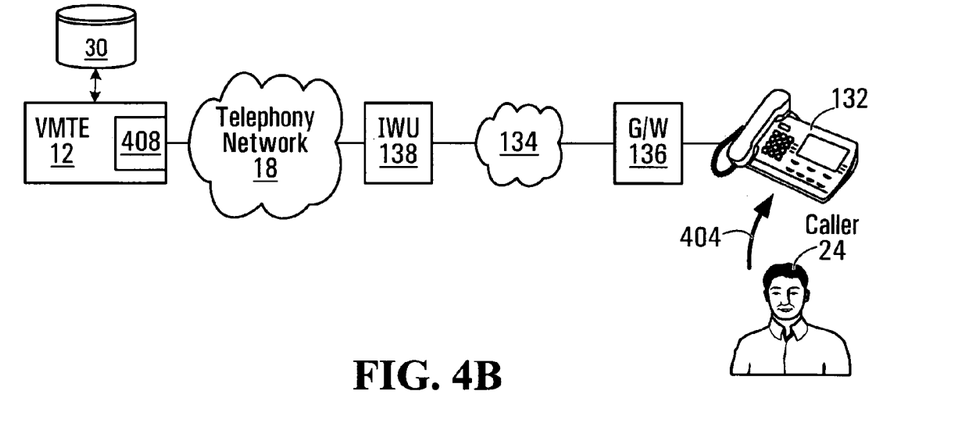
Figure 4C:
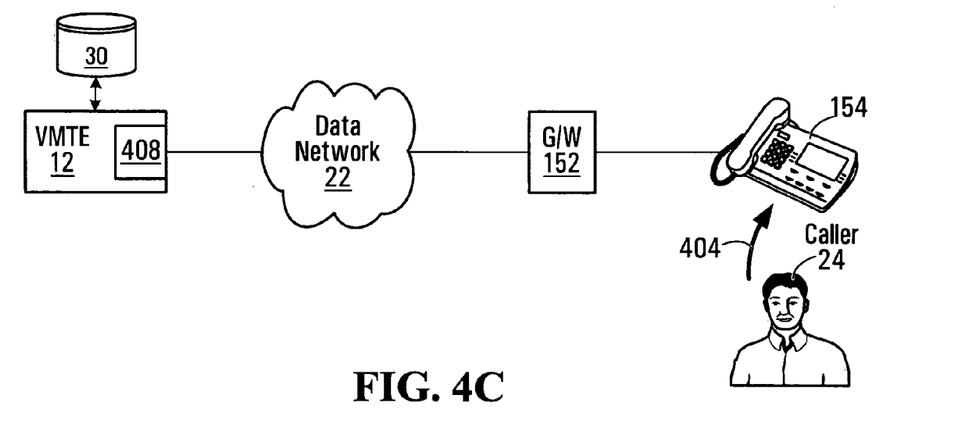

In a second example embodiment illustrated in FIGS. 4A, 4B and 4C, the reconnaissance process actively determines the originating address associated with the caller 24, i.e., through actual interaction with the caller 24. This embodiment is particularly useful where the entry 206 in the OA field of the record 204 contains a code 210. It is recalled that the code 210 will have been specified by the caller 24 during the registration phase.

Specifically, as shown in FIG. 4A, when the caller 24 uses a telephone (112, 124, 144), the VMTE 12 may execute an interactive voice response system 402 to prompt the caller 24 to input a second code 404. In a similar fashion, when the caller 24 is using an IP-enabled telephony device (132, 154), the VMTE 12 may also execute an interactive voice response system 408 to elicit the second code 404 from the caller 24. However, because of the relatively high level of sophistication inherent to the IP-enabled telephony device being used by the caller 24, it may be possible to enhance the interactive voice response system 408 to include text-based or graphical means for eliciting the second code 404 from the caller 24 (e.g., by way of a graphical user interface).

Figure 5:
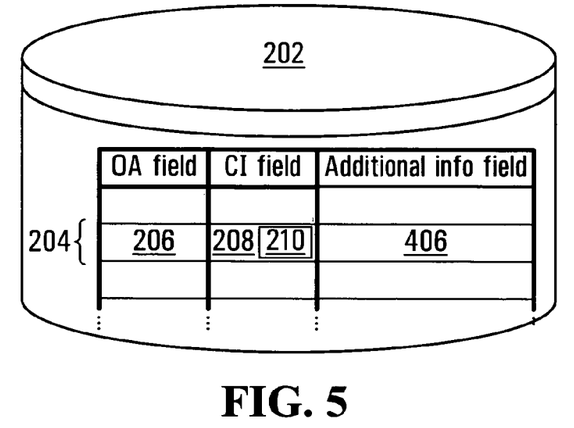
FIG. 5 illustrates a possible structure of the contact information database in the CIS, in accordance with another embodiment of the present invention.

The second code 404 is presumed to correspond to the code 210 occupying the entry 206 in the OA field of the record 204 in the contact information database 202. However, if there is reason to believe that the second code 404 may differ from the first code 210, then an authentication process may be performed by the VMTE 12, such as to require the caller 24 to enter additional information that will authenticate him or her. To this end, and as shown in FIG. 5, the contact information database 202 in the CIS 14 may be augmented so as to contain an additional information field. For the caller 24, an entry 406 in the additional information field of the record 204 could be supplied during the registration phase, at the same time as the caller 24 provided information for the entries 206 and 208 in the OA field and CI field, respectively, of the record 204.

Figure 8:
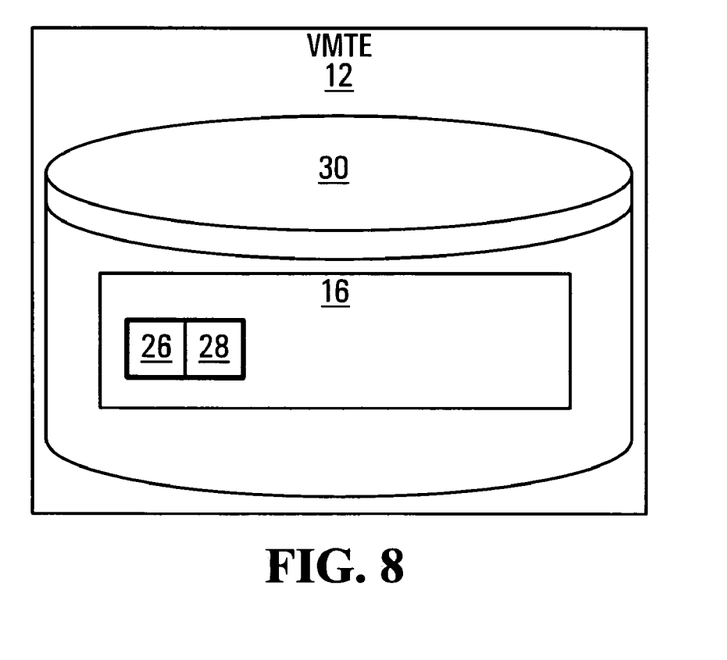
FIG. 8 illustrates a possible structure of a mailbox database in the VMTE, in accordance with an embodiment of the present invention.

Once the VMTE 12 has determined the originating address associated with the caller 24 in accordance with the reconnaissance process described above, and once recording of the voice mail message is complete, the VMTE 12 stores both items of information in association with one another in mailbox 16. Referring to FIG. 8, the voice mail message deposited by the caller 24 in mailbox 16 is denoted by the reference number 26, and as mentioned above, the originating address associated with the caller 24 is stored in association with the voice mail message 26 and represented by reference number 28. Due to this double association, i.e., the originating address associated with the caller 24 being associated with the voice mail message 26, the item of information that is denoted by reference numeral 28 will hereinafter be referred to as the "message-26-caller-originating-address".

III— Delivery of Contact Information to the Owner of Mailbox 16

Figure 6:
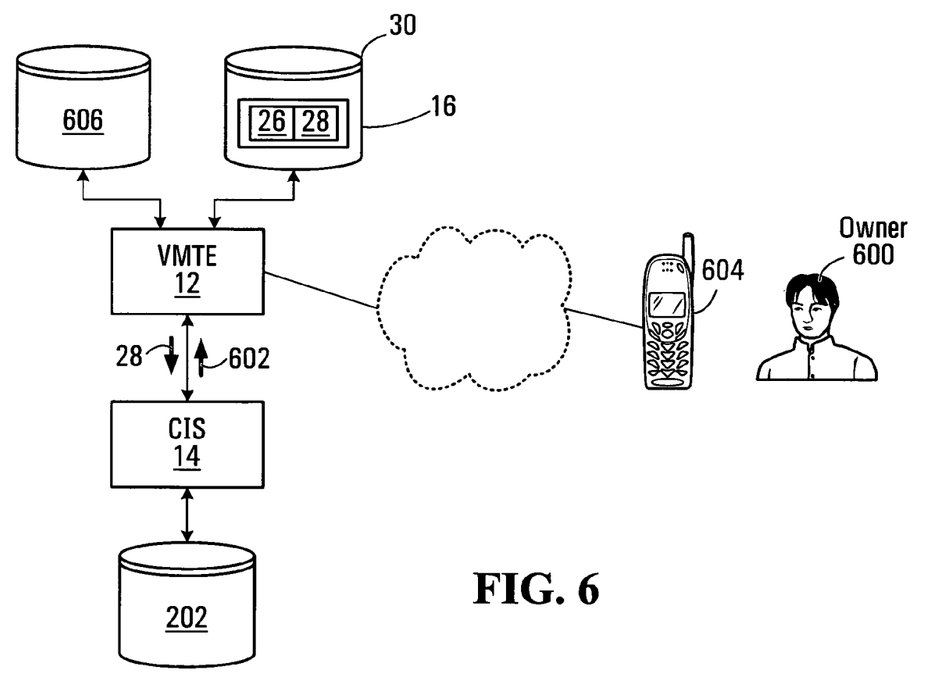
FIG. 6 is a conceptual block diagram illustrating retrieval of a voice mail message from a mailbox by the owner of the mailbox, in accordance with an embodiment of the present invention.

At some instant in time subsequent to the calling phase, and as now described with reference to FIG. 6, the owner of mailbox 16 (hereinafter referred to simply as the "owner" and designated by reference numeral 600) interacts with the VMTE 12, using a telephony device 604 of the user's choice, which may be a conventional wireline or wireless telephone, an IP-enabled telephony device (including but not limited to an IP phone or a desktop or laptop computer equipped with telephony software), etc. During the owner's 600 interaction with the VMTE 12, a "contact information acquisition process" in the VMTE 12 will be triggered, followed by execution of a "delivery process" that delivers the acquired contact information to the owner 600.

The contact information acquisition process can be triggered under various conditions, e.g., in response to the owner 600 accessing mailbox 16, or in response to the owner 600 initiating playback of any one of the voice mail messages (such as the message 26) in mailbox 16, etc. The contact information acquisition process begins with the VMTE 12 obtaining the contact information associated with one or more callers who left voice mail messages in mailbox 16.

In the specific case of the voice mail message 26 that was deposited by the caller 24, it is recalled (see FIG. 8) that the VMTE 12 stores the voice mail message 26 in association with the "message-26-caller-originating-address" 28. Thus, as part of the contact information acquisition process, the VMTE 12 uses the "message-26-caller-originating-address" 28 to query the CIS 14. The CIS 14 then consults the contact information database 202 in an attempt to find a record for which the entry in the OA field corresponds to the "message-26-caller-originating-address" 28 supplied by the VMTE 12.

In this particular example, it is assumed that there is a match, namely it is assumed that the entry 206 in the OA field of the record 204 in the contact information database 202 of the CIS 14 corresponds to the "message-26-caller-originating-address" 28. In response, the CIS 14 returns the entry 208 in the CI field of the record 204 to the VMTE 12. The contact information obtained in this manner may be termed "message-26-acquired-contact-information" and denoted by the reference number 602. (The aforementioned sequence may be repeated for other voice mail messages, if any, in mailbox 16.)

Next, the delivery process involves the VMTE 12 delivering the acquired contact information, including the "message-26-acquired-contact-information" 602, to the owner 600. For example, where the device 604 being used by the owner 600 to access the voice mail message 26 in mailbox 16 is a conventional telephone, the "message-26-acquired-contact-information" 602 can be audibly played back (e.g., converted into speech) responsive to entry of a command by the owner 600 via a touch-tone keypad or voice utterance, in which case it is apparent that delivery is performed in response to an action by the owner 600. Alternatively, the "message-26-acquired-contact-information" 602 can be audibly played back at the tail end or beginning of the voice mail message 26 in an autonomous fashion, i.e., delivery occurs without the entry of specific commands from the owner 600.

Alternatively, the VMTE 12 may send an electronic message (e.g., instant message, email message, real-time text message such as SMS) to an address (e.g., an IP address) associated with the owner 600. The electronic message may contain the "message-26-acquired-contact-information" 602 in the form of, for example, a text message, an attachment, a uniform resource locator (URL), etc. It is noted that in order for the VMTE 12 to learn the address associated with the owner 600, the VMTE 12 may consult a database 606.

In one embodiment, the database 606 maintains an association between the address associated with the owner 600 and the identity of mailbox 16, which is also associated with the owner 600. Thus, the mere fact that the owner 600 has accessed mailbox 16, is sufficient to determine the address associated with the owner 600.

In another embodiment, the database 606 maintains an association between the address associated with the owner and one or more parameters that can be learned during the time that the owner 600 is accessing mailbox 16. One example of such a parameter is a directory number of the device 604 when implemented as a telephone. For its part, the directory number of the device 604 can be obtained using technologies such as caller line identification (CLID). Other examples of such a parameter include a MAC address of the device 604 when implemented as a computing device (such as a computing device implementing a soft client), an electronic serial number (ESN) of the device 604 when implemented as a wireless device (such as a cellular phone or networked personal digital assistant, to name a few) and an IP address of the device 604 when implemented as an IP-enabled telephony device such as an IP phone. The MAC address, IP address or ESN can be learned from packets or signals received from the respective device 604 during interaction with the VMTE 12.

It should be noted that the database 606 may be populated during an initial registration phase involving the owner 600 (this registration phase being distinct from the registration phase described earlier in this specification and involving the caller 24).

Alternatively, the VMTE 12 may send a plurality of electronic messages to respective pre-determined addresses (e.g., IP addresses) associated with the owner 600. In the case of two electronic messages, one can be in the form of a notification (such as an instant message or real-time text message) sent to a first pre-determined address, while the other can be in the form of a lengthier electronic message (e.g., an email message) sent to a second pre-determined address.

Also, the pre-determined address(es) can be totally independent of the device 604 that is being used by the owner 600 to access mailbox 16. For example, the owner 600 may be using a pay phone to access the voice mail message 26, while the electronic message(s) can be sent to the owner's 600 Internet service provider.

It will thus be appreciated that because the "message-26-acquired-contact-information" 602 is not embedded in the voice mail message 26, the contact information 602 can be accessed by and delivered to the owner 600 independently of the manner in which the voice mail message 26 is accessed by or delivered to the owner 600. This contributes to a greater efficiency in the manner in which the owner 600 can retrieve the contact information for various messages in the mailbox 16.

Moreover, the contact information 602 may be more than a mere audio recording, since the present invention provides for a wide variety of text, audio and video to be delivered as contact information. This is made possible by advance registration of the caller's 24 contact information at the CIS 14, which allows the caller 24 to leave non-audio contact information that is beyond the capabilities of the device being used by the caller 24 to leave the voice mail message 26. Furthermore, the contact information 602 may contain actionable items such as hyperlinks.

In addition, because the contact information associated with the caller 24 is registered centrally (at the CIS 14), the caller 24 who wishes to leave his or her contact information for multiple intended recipients need not be concerned with replicating the contact information for each intended recipient; rather the contact information to be delivered to each intended recipient is retrieved by the VMTE 12 on the basis of the originating address associated with the caller 24, which is determined either autonomously or by having the caller 24 enter a code. The process by which the caller 24 leaves contact information for the intended recipient is therefore accelerated.

IV—Alternatives and Variants

It is within the scope of the invention to deliver and present contact information in a form that is convenient for the owner 600. For example, if the device 604 used by the owner 604 executes a Microsoft Outlook™-type software application, then it is within the scope of the present invention for the VMTE 12 to provide contact information in a format that is easily actionable by the owner through mouse clicks. Taking the example of the voice mail message 26, if the "message-26-acquired-contact-information" 602 contains an attachment or URL, then it is within the scope of the present invention for the VMTE 12 to send this information to the device 604 in a suitable format so as to allow the owner 604 to simply double-click on the attachment in order to open it or click on the URL in order to visit it on the Internet.

In yet another alternative embodiment, it is not necessary to wait until the owner 600 had begun an interaction with the VMTE 12 before executing the contact information acquisition process. Specifically, the VMTE 12 may query the CIS 14 at an earlier stage, e.g., as soon as the "message-26-caller-originating-address" 28 has been obtained. In response to obtaining the "message-26-acquired-contact-information" 602 from the CIS 14, the VMTE 12 stores this information in mailbox 16 in association with the voice mail message 26. In this case, it is not necessary to store the "message-26-caller-originating-address" 28. It is noted that this alternative embodiment may require more memory in the VMTE 12 because contact information tends to be more memory-rich than an originating address.

It should also be appreciated that in applications where voice mail messages are forwarded to a conversion entity for conversion to other forms of messages (e.g., electronic messages), the acquired contact information associated with a given voice mail message can accompany the given voice mail message when it is forwarded to the conversion entity.

Figure 7:
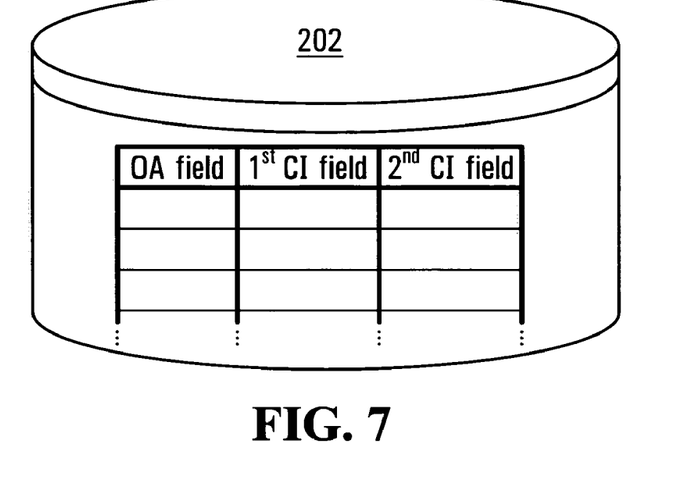
FIG. 7 illustrates a possible structure of the contact information database in the CIS, in accordance with yet another embodiment of the present invention.

Various other modifications and enhancements are possible. Consider, for example, the scenario where the caller 24 wishes to choose between leaving first contact information (e.g., personal contact information with home telephone number) and second contact information (e.g., business contact information with company logo and URL). In this case, and with reference to FIG. 7, the contact information database 202 in the CIS 14 will store records that contain an OA field, as well as a first CI field and a second CI field. Thus, during the registration phase for the caller 24, the first contact information associated with the caller 24 will reside in the first CI field and the second contact information associated with the caller 24 will reside in the second CI field.

This alternative embodiment also calls for an additional level of interaction between the VMTE 12 with the caller 24 in order to ensure that the appropriate CI field is being delivered to the owner 600. Specifically, the VMTE 12 implements, as part of the interactive voice response system 402 or 408, a function whereby the caller 24 inputs a "contact information selection" specifying which contact information applies for the current voice mail message. For example, this could be achieved by way of an interactive voice prompt such as "press 1 for personal contact information, 2 for business contact information, or 9 for no contact information". The selection (e.g., personal or business) is stored alongside the originating address associated with the caller and the voice mail message left by the caller 24.

It will thus be appreciated that in the above embodiment, the contact information delivered to the owner 600 will reflect the nature of the contact information that the caller 24 wanted to leave. This concept can be extended to provide for various possibilities such as seasonally dependent electronic greeting cards, as well as availability-dependent electronic greeting cards (such as when the caller 24 is temporarily unavailable or out of the office or on vacation, etc.).

Still other embodiments are possible. For example, consider a registration phase whereby the caller 24 uploads multiple attachments over the data network 22. Then, during the calling phase, the caller 24 is permitted to navigate through the previously uploaded attachments in order to select a specific attachment to deposit as contact information for a given voice mail message in mailbox 16. In this way, selected attachments can be left for selected owners and/or in associated with selected messages.

Those skilled in the art will appreciate that in some embodiments, certain functionality of the VMTE 12 and the CIS 14 may be implemented as pre-programmed hardware or firmware elements (e.g., application specific integrated circuits (ASICs), electrically erasable programmable read-only memories (EEPROMs), etc.), or other related components. In other embodiments, the VMTE 12 and the CIS 14 may comprise an arithmetic and logic unit (ALU) having access to a code memory (not shown) which stores program instructions for the operation of the ALU in order to execute the various processes described above. The program instructions could be stored on a medium which is fixed, tangible and readable directly by the VMTE 12 and the CIS 14, (e.g., removable diskette, CD-ROM, ROM, or fixed disk), or the program instructions could be stored remotely but transmittable to the VMTE 12 and the CIS 14 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method for execution by a system comprising a voice message taking entity (VMTE) and a contact information server (CIS), the method comprising:
    one of the VMTE and the CIS taking a voice message from a calling party for an owner of a mailbox;
    one of the VMTE and the CIS receiving an originating address associated with the calling party;
    one of the VMTE and the CIS accessing a database of records associated with respective potential calling parties, each of the records in the database comprising a respective originating address field and a respective contact information field, the originating address field of the record associated with a given potential calling party containing an originating address associated with the given potential calling party and the contact information field of the record associated with the given potential calling party containing an alternative address at which the given potential calling party is contactable, the alternative address being different from the originating address associated with the given potential calling party, the alternative address having been obtained during a prior registration phase involving the given potential calling party;
    wherein accessing the database of records comprises attempting to identify a particular record in the database for which the originating address contained in the respective originating address field corresponds to the originating address associated with the calling party;
    responsive to successful identification of a particular record in the database for which the originating address contained in the respective originating address field matches the originating address associated with the calling party, one of the VMTE and the CIS retrieving the alternative address contained in the contact information field of the particular record;
    one of the VMTE and the CIS delivering the retrieved alternative address to the owner of the mailbox;
    wherein delivering the retrieved alternative address to the owner of the mailbox comprises sending a message indicative of the alternative address to a particular address learned during interaction with the owner of the mailbox.

2. The method defined in claim 1, wherein said originating address associated with the calling party is received by the CIS from the VMTE during interaction with the calling party.

3. The method defined in claim 2, further comprising returning the retrieved alternative address to the voice message taking entity.

4. The method defined in claim 3, further comprising authenticating the calling party prior to returning the retrieved alternative address to the voice message taking entity.

5. The method defined in claim 1, wherein said originating address associated with the calling party is passively determined based on information obtained during communication with the calling party.

6. The method defined in claim 5, wherein said information obtained during communication with the calling party comprises a directory number associated with the calling party.

7. The method defined in claim 5, wherein said information obtained during communication with the calling party comprises an IP address associated with the calling party.

8. The method defined in claim 2, wherein said originating address associated with the calling party is passively determined by the voice message taking entity during interaction with the calling party.

9. The method defined in claim 1, wherein said originating address associated with the calling party is determined by interacting with the calling party to elicit input from the calling party specifying the originating address associated with the calling party.

10. The method defined in claim 9, wherein said input from the calling party comprises a code.

11. The method defined in claim 2, wherein said originating address is determined by the voice message taking entity interacting with the calling party to elicit input from the calling party specifying the originating address associated with the calling party.

12. A system, comprising:
    a contact information server comprising a database of records, each of the records being associated with a respective potential calling party and including (I) an originating field containing an originating address associated with the respective potential calling party; and (II) a contact information field containing an alternative address at which the respective potential calling party is contactable, the alternative address being different from the originating address associated with the respective calling party, the alternative address having been obtained during a prior registration phase involving the respective calling party;
    a voice message taking entity comprising a plurality of mailboxes associated with respective mailbox owners, the voice message taking entity being operable for executing a reconnaissance process to (I) determine an originating address associated with a particular calling party attempting to reach an owner of a particular mailbox; and (II) supply the originating address associated with the particular calling party to the contact information server;
    the contact information server being adapted for:
        responsive to receipt of the originating address associated with the particular calling party from the voice message taking entity, accessing the database of records in an attempt to identify a particular record in the database for which the originating address contained in the respective originating address field corresponds to the originating address associated with the particular calling party;

responsive to successful identification of a particular record in the database for which the originating address contained in the respective originating address field matches the originating address associated with the particular calling party, retrieving the alternative address contained in the contact information field of the particular record;

returning the retrieved alternative address to the voice message taking entity for delivery to the owner of the particular mailbox;

wherein delivery of the retrieved alternative address to the owner of the mailbox comprises transmission of a message indicative of the alternative address to a particular address learned during interaction with the owner of the mailbox.

13. The method defined in claim 1, wherein said alternative address includes a telephone number.

14. The method defined in claim 1, wherein said alternative address includes a fax number.

15. The method defined in claim 1, wherein said alternative address includes an email address.

16. The method defined in claim 1, wherein said alternative address includes a web page address.

17. The method defined in claim 1, wherein said alternative address includes a hyperlink.

18. The method defined in claim 1, further comprising determining the particular address based on a directory number of a device used by the owner of the mailbox to access the mailbox.

19. A method for execution by a system comprising a voice message taking entity (VMTE) and a contact information server (CIS), the method comprising:

one of the VMTE and the CIS taking a voice message from a calling party for an owner of a mailbox;

one of the VMTE and the CIS receiving an originating address associated with the calling party;

one of the VMTE and the CIS accessing a database of records associated with respective potential calling parties, each of the records in the database comprising a respective originating address field and a respective contact information field, the originating address field of the record associated with a given potential calling party containing an originating address associated with the given potential calling party and the contact information field of the record associated with the given potential calling party containing an alternative address at which the given potential calling party is contactable, the alternative address being different from the originating address associated with the given potential calling party, the alternative address having been obtained during a prior registration phase involving the given potential calling party;

wherein accessing the database of records comprises attempting to identify a particular record in the database for which the originating address contained in the respective originating address field corresponds to the originating address associated with the calling party;

responsive to successful identification of a particular record in the database for which the originating address contained in the respective originating address field matches the originating address associated with the calling party, one of the VMTE and the CIS retrieving the alternative address contained in the contact information field of the particular record;

one of the VMTE and the CIS delivering the retrieved alternative address to the owner of the mailbox;

wherein delivering the retrieved alternative address to the owner of the mailbox comprises sending a message indicative of the alternative address to an address associated with the mailbox.

20. The method defined in claim 19, wherein said originating address associated with the calling party is received by the CIS from the VMTE during interaction with the calling party.

21. The method defined in claim 20, further comprising returning the retrieved alternative address to the voice message taking entity.

22. The method defined in claim 21, further comprising authenticating the calling party prior to returning the retrieved alternative address to the voice message taking entity.

23. The method defined in claim 19, wherein said originating address associated with the calling party is passively determined based on information obtained during communication with the calling party.

24. The method defined in claim 23, wherein said information obtained during communication with the calling party comprises a directory number associated with the calling party.

25. The method defined in claim 23, wherein said information obtained during communication with the calling party comprises an IP address associated with the calling party.

26. The method defined in claim 20, wherein said originating address associated with the calling party is passively determined by the voice message taking entity during interaction with the calling party.

27. The method defined in claim 19, wherein said originating address associated with the calling party is determined by interacting with the calling party to elicit input from the calling party specifying the originating address associated with the calling party.

28. The method defined in claim 27, wherein said input from the calling party comprises a code.

29. The method defined in claim 20, wherein said originating address is determined by the voice message taking entity interacting with the calling party to elicit input from the calling party specifying the originating address associated with the calling party.

30. The method defined in claim 19, the message being a first message, the address associated with the mailbox being a first address, the method further comprising sending a second message to a second address associated with the mailbox, the second message notifying of the first message.

31. The method defined in claim 30, wherein the second message is one of a real-time text message and an instant message.

32. The method defined in claim 31, wherein the first message is an email message.

33. A system, comprising:

a contact information server comprising a database of records, each of the records being associated with a respective potential calling party and including (I) an originating field containing an originating address associated with the respective potential calling party; and (II) a contact information field containing an alternative address at which the respective potential calling party is contactable, the alternative address being different from the originating address associated with the respective calling party, the alternative address having been obtained during a prior registration phase involving the respective calling party;

a voice message taking entity comprising a plurality of mailboxes associated with respective mailbox owners, the voice message taking entity being operable for executing a reconnaissance process to (I) determine an originating address associated with a particular calling party attempting to reach an owner of a particular mailbox; and (II) supply the originating address associated with the particular calling party to the contact information server;

the contact information server being adapted for:

responsive to receipt of the originating address associated with the particular calling party from the voice message taking entity, accessing the database of records in an attempt to identify a particular record in the database for which the originating address contained in the respective originating address field corresponds to the originating address associated with the particular calling party;

responsive to successful identification of a particular record in the database for which the originating address contained in the respective originating address field matches the originating address associated with the particular calling party, retrieving the alternative address contained in the contact information field of the particular record;

returning the retrieved alternative address to the voice message taking entity for delivery to the owner of the particular mailbox;

wherein delivery of the retrieved alternative address to the owner of the mailbox comprises transmission of a message indicative of the alternative address to an address associated with the mailbox.

* * * * *